(12) United States Patent
Shynn et al.

(10) Patent No.: US 10,933,729 B2
(45) Date of Patent: Mar. 2, 2021

(54) METHODS AND SYSTEMS FOR A POWERTRAIN MOUNT ASSEMBLY

(71) Applicant: Ford Global Technologies, LLC, Dearborn, MI (US)

(72) Inventors: Matthew Shynn, Chelmsford (GB); Brad Staines, Bishops Stortford (GB); Michael Spurling, Romford (GB); Vlad Sunjerian, Brentwood (GB); Alan Thorpe, Harlow (GB); Peter Brook, South Woodham Ferrers (GB); Jonathan Horseman, Braintree (GB); Matthew Sykes, Wickford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 16/226,307

(22) Filed: Dec. 19, 2018

(65) Prior Publication Data

US 2019/0184804 A1 Jun. 20, 2019

(30) Foreign Application Priority Data

Dec. 20, 2017 (GB) ..................................... 1721471

(51) Int. Cl.
*B60K 5/12* (2006.01)
*B62D 21/15* (2006.01)

(52) U.S. Cl.
CPC .......... *B60K 5/1275* (2013.01); *B60K 5/1216* (2013.01); *B62D 21/152* (2013.01); *B60Y 2306/01* (2013.01)

(58) Field of Classification Search
CPC ...... B60K 5/1275; B60K 5/1216; B60K 5/12; B62D 21/152; B62D 21/15; B60Y 2306/01

USPC ......................................................... 180/232
See application file for complete search history.

(56) References Cited

U.S. PATENT DOCUMENTS

| | | | |
|---|---|---|---|
| 6,131,685 A | 10/2000 | Sakamoto et al. | |
| 7,594,559 B2 * | 9/2009 | Kitoh | B62D 21/155 180/232 |
| 8,403,097 B2 * | 3/2013 | Joly | F16F 1/373 180/291 |

(Continued)

FOREIGN PATENT DOCUMENTS

| | | |
|---|---|---|
| DE | 2241651 A1 | 3/1974 |
| DE | 19748644 A1 | 5/1999 |

(Continued)

OTHER PUBLICATIONS

Machine Translation of JP-2004231018-A (Year: 2004).*

(Continued)

*Primary Examiner* — James A English
*Assistant Examiner* — Kurtis Nielson
(74) *Attorney, Agent, or Firm* — Geoffrey Brumbaugh; McCoy Russell LLP

(57) ABSTRACT

Methods and systems are provided for a powertrain support mount assembly. In one example, the powertrain support mount assembly comprises a first bracket and a second bracket, the second bracket comprising an engagement feature shaped to engage with the first bracket during a vehicle collision, which adjusts a load of the second bracket to decouple from the engage and avoid contacting an auxiliary component adjacent to the powertrain.

19 Claims, 4 Drawing Sheets

(56) References Cited

U.S. PATENT DOCUMENTS

| | | | |
|---|---|---|---|
| 10,066,698 B2* | 9/2018 | Kaneko | B60K 5/1208 |
| 2003/0209380 A1 | 11/2003 | Anzai et al. | |
| 2004/0130078 A1 | 7/2004 | Huber | |
| 2009/0236166 A1* | 9/2009 | Kowaki | B62D 21/152 |
| | | | 180/232 |
| 2014/0360798 A1 | 12/2014 | Ghislieri et al. | |
| 2017/0036526 A1* | 2/2017 | Horseman | B60K 5/1208 |
| 2017/0267091 A1* | 9/2017 | Takahashi | B60K 5/1208 |
| 2018/0162211 A1* | 6/2018 | Kim | B60K 5/1291 |
| 2019/0031011 A1* | 1/2019 | Fujiaki | B62D 21/02 |
| 2019/0217893 A1* | 7/2019 | Dandekar | B60K 5/1275 |

FOREIGN PATENT DOCUMENTS

| | | | | |
|---|---|---|---|---|
| DE | 10028704 A1 | 12/2001 | | |
| EP | 1036689 A2 * | 9/2000 | | B62D 21/152 |
| EP | 1260427 A2 | 11/2002 | | |
| EP | 2189317 A1 | 5/2010 | | |
| FR | 2315422 A1 * | 1/1977 | | B62D 39/00 |
| FR | 3011204 A1 | 4/2015 | | |
| FR | 3018060 A1 | 9/2015 | | |
| GB | 2329877 A | 4/1999 | | |
| JP | H104362418 A | 12/1992 | | |
| JP | 2004231018 A * | 8/2004 | | |
| JP | 2004231018 A | 8/2004 | | |

OTHER PUBLICATIONS

English Version (GB1515469A) of FR-2315422-A1 (Year: 1978).*
Machine Translation of EP-1036689-A2 (Year: 2000).*
Great Britain Intellectual Property Office, Combined Search and Examination Report under Sections 17 and 18(3) issued in Application No. GB1721471.9, dated Jun. 18, 2018, 5 pages.

* cited by examiner

METHODS AND SYSTEMS FOR A POWERTRAIN MOUNT ASSEMBLY

CROSS REFERENCE TO RELATED APPLICATION

This application claims priority to Great Britain Patent Application No. 1721471.9, filed Dec. 20, 2017. The entire contents of the above-referenced application are hereby incorporated by reference in their entirety for all purposes.

FIELD

The present description relates generally to a powertrain support mount for a motor vehicle configured to reduce dash intrusions during a collision of the motor vehicle.

BACKGROUND/SUMMARY

A powertrain for a motor vehicle is typically coupled to a support frame of the vehicle by a plurality of engine mounts. One or more of the engine mounts may be configured to fail during a collision of the motor vehicle such that the powertrain becomes decoupled from the support frame at the mount and is displaced in a desirable manner during the collision.

In some examples, a support rail may be coupled to a component of the powertrain via a mount comprising a first bracket and a second bracket. During normal operation of a vehicle, the first and second brackets may be configured to transfer loads from the powertrain to the support rail via the mount. Normal operation of the vehicle may include operation of the vehicle outside of a vehicle collision.

The support rail may additionally form a portion of a crash structure of the vehicle and may deform and buckle during a collision to dissipate energy. The first bracket may be pulled away from the second bracket in response to the support rail buckling. By doing this, the powertrain component may move past an ancillary component, such as a brake master servo, without colliding with the ancillary component.

However, the inventors herein have recognized potential issues with such systems. As one example, if the second bracket remains coupled to the powertrain component during the collision, then the second bracket may collide with the ancillary component, which may cause the ancillary component to be deflected and deform a dash panel of the vehicle, which may result in the ancillary component intruding into a cabin of the vehicle.

According to an aspect of the present disclosure, there is provided a support mount assembly for a powertrain of a motor vehicle. The support mount assembly comprises a first bracket configured to couple to a support frame of the motor vehicle; and a second bracket, the second bracket comprising a coupling, wherein the second bracket is configured to couple to a powertrain component of the motor vehicle at the coupling, wherein one of the first and second brackets comprises an engagement feature configured to engage the other of the first and second brackets when the support frame is deflected during a collision of the vehicle, such that the first bracket is pulled away from the second bracket, the engagement feature engaging the other of the first and second brackets, such that the first bracket applies a load to the second bracket (e.g. from the support frame) to decouple the second bracket from the powertrain component.

The engagement feature may comprise an arm extending substantially parallel to a longitudinal axis of the vehicle. For example, the engagement feature may extend in a direction substantially parallel with a support rail of the support frame (e.g. to which the first bracket is coupled). The engagement feature may extend in a rearwards direction of the motor vehicle. The engagement feature may comprise one or more stiffening features, such as ribs, webs and/or areas of increased thickness.

The other of the first and second brackets may comprise an abutment feature configured to engage with the engagement feature during the collision. The abutment feature may comprise one or more stiffening features The second bracket may comprise the engagement feature and the first bracket may comprise the abutment feature.

The first bracket may define an aperture. A portion of the second bracket may pass through the aperture formed in the first bracket. The abutment feature may be formed adjacent to the aperture, e.g. at an edge of the aperture. The engagement feature may extend in a direction parallel to a plane of the aperture, (e.g. perpendicular to a direction in which the second bracket passes though the aperture).

The coupling may be arranged on a first side of the aperture. The engagement feature may be arranged on a second side of the aperture.

The first bracket may comprise two parts and the aperture may be formed between the two parts.

A width and/or height of the engagement feature may be greater than a respective width and/or height of the aperture, e.g. such that the engagement feature is prevented from passing through the aperture. A cross-sectional area of the engagement feature may be greater than a cross-sectional area of the aperture (e.g. in a plane perpendicular to the direction in which the second bracket extends though the aperture).

The first and second brackets may be configured to transfer load between the power train component and the support frame in a first direction when the engagement feature is not engaging the first bracket, and in a second direction when the engagement feature is engaging the first bracket. For example, the first and second brackets may be configured to engage one another at a location away from the engagement feature (e.g. at the aperture), such that load is transferred between the powertrain component and the support frame in a first direction, e.g. during normal use of the motor vehicle.

The first and second brackets may be configured such that load can be transferred between the power train component and the support frame (e.g. via the engagement feature) in a second direction when the engagement feature is engaged (e.g. during the collision).

Load may be transferred in the second direction in addition to load being transferred in the first direction. The second direction may be at an angle (e.g. a non-zero angle) to the first direction.

The first direction may be substantially perpendicular to the second direction. For example, the first direction may be substantially vertical and the second direction may be a substantially lateral direction of the motor vehicle.

The first bracket may be configured to retain the second bracket after the second bracket has decoupled from the powertrain component (e.g. such that the second bracket is coupled to the support frame by the first bracket). The second bracket may be retained at least partially within the aperture (e.g. during the collision).

The coupling may comprise one or more weakening features configured to encourage the second bracket to fail, e.g. fracture, at the coupling during the collision (e.g. under the load applied by the first bracket). The weakening feature may comprise notches or areas of reduced wall thickness adjacent to fastener locations defined by the coupling. Failure of the coupling may decouple the second bracket from the powertrain component.

According to another aspect of the present disclosure, there is provided a support structure assembly for a motor vehicle comprising: a support rail; and the powertrain support mount assembly of any of the preceding claims, wherein the first bracket of the powertrain support mount is coupled to the support rail.

The support rail may be configured to buckle during a collision and displace the first bracket such that the engagement feature becomes engaged (e.g. with the first bracket).

The support rail may be configured to buckle during the collision such that the powertrain support mount assembly is displaced away from a dash panel or an auxiliary component of the motor vehicle relative to the powertrain component (e.g. following decoupling of the second bracket from the power train component).

The support rail may comprise a buckling initiation feature on each side of the powertrain support mount assembly along the support rail.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3 and 4 are shown approximately to scale, although other relative dimensions may be used, if desired.

DETAILED DESCRIPTION

Figure 1A:
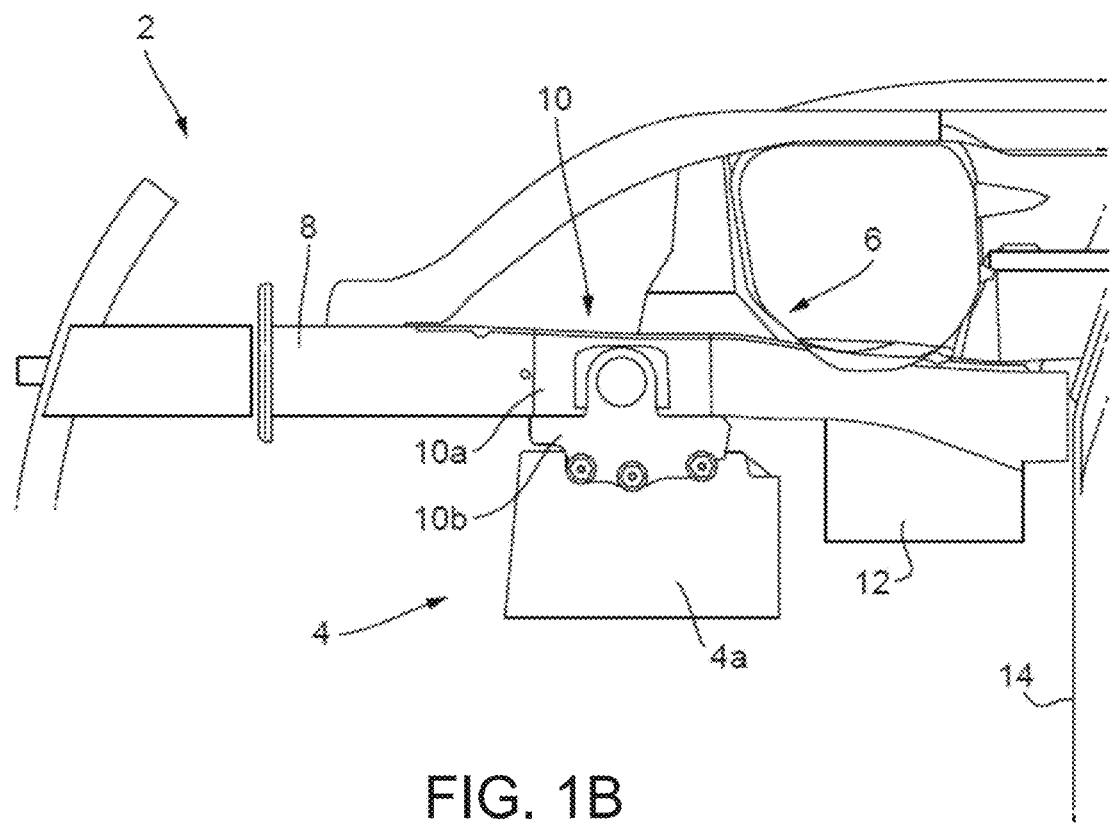
FIG. 1A shows a partial schematic top view of a vehicle assembly prior to a collision.
Figure 1B:
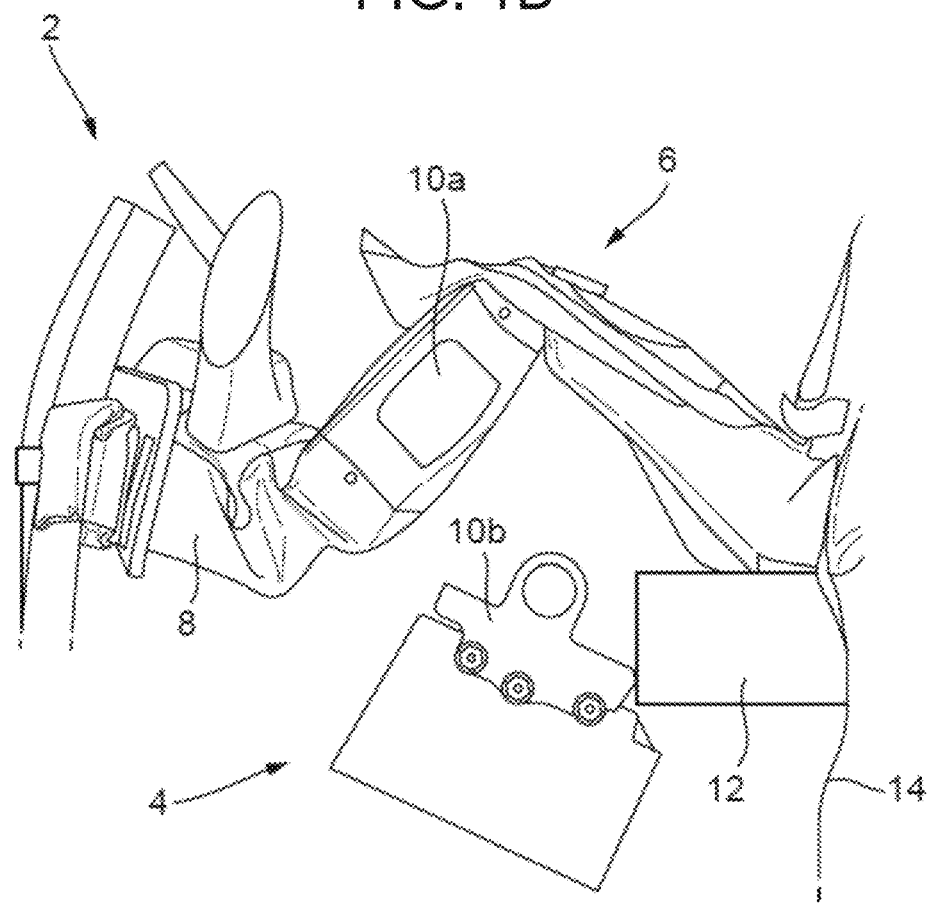
FIG. 1B shows a partial schematic top view of a vehicle assembly during a collision.
Figure 2:
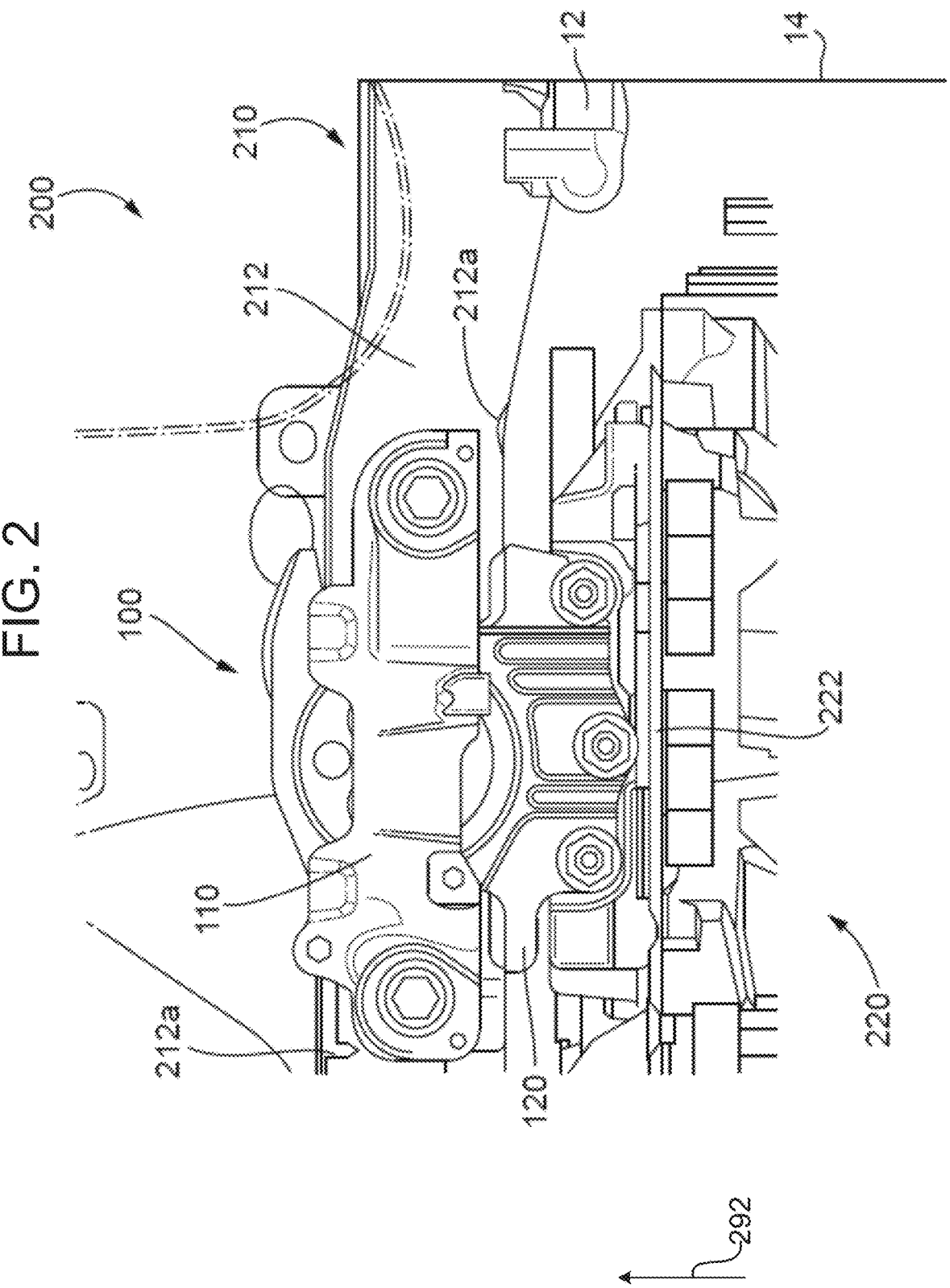
FIG. 2 shows a top view of a vehicle assembly, according to arrangements of the present disclosure, prior to a collision.
Figure 3:
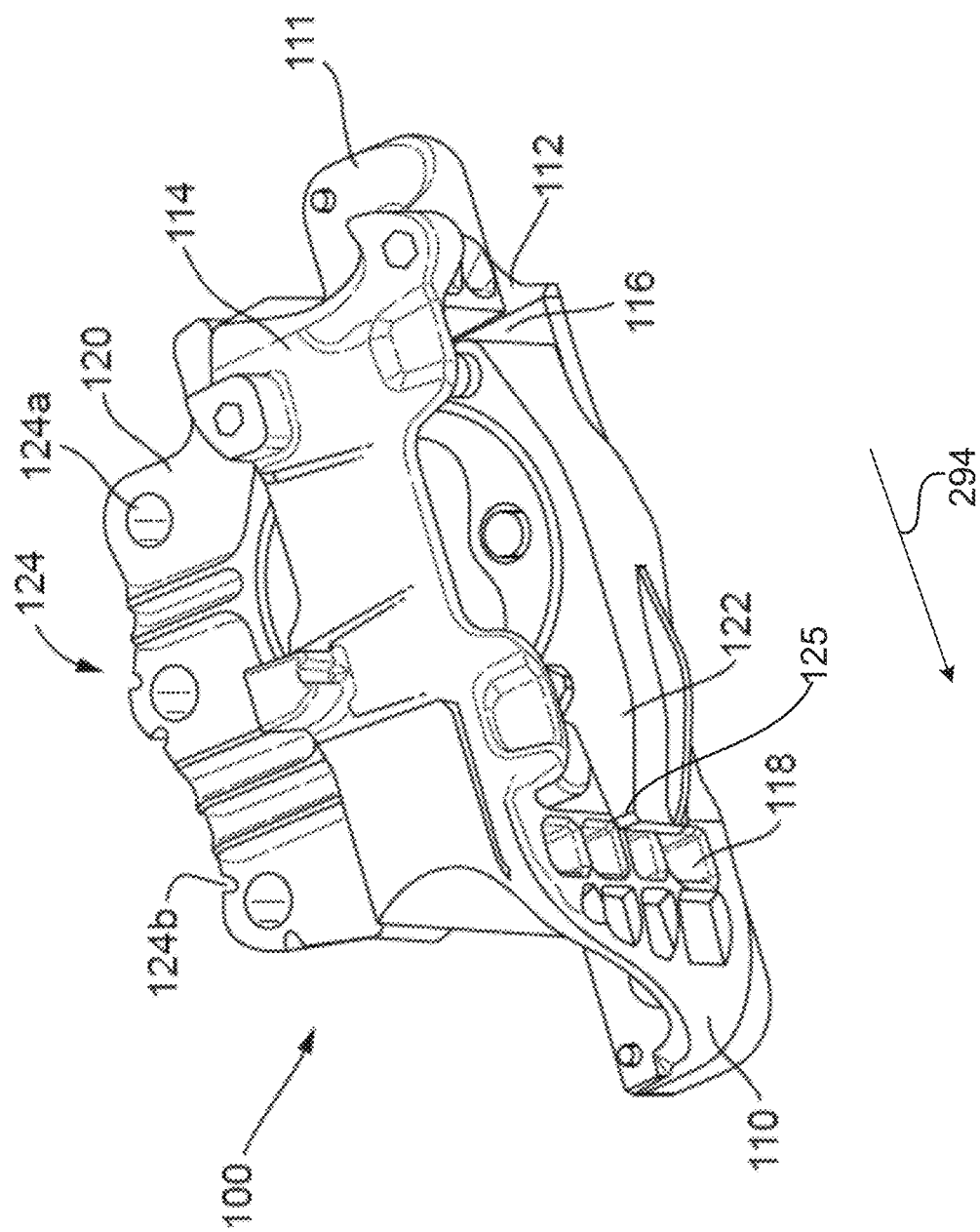
FIG. 3 shows a perspective view of a powertrain mount according to arrangements of the present disclosure.
Figure 4:
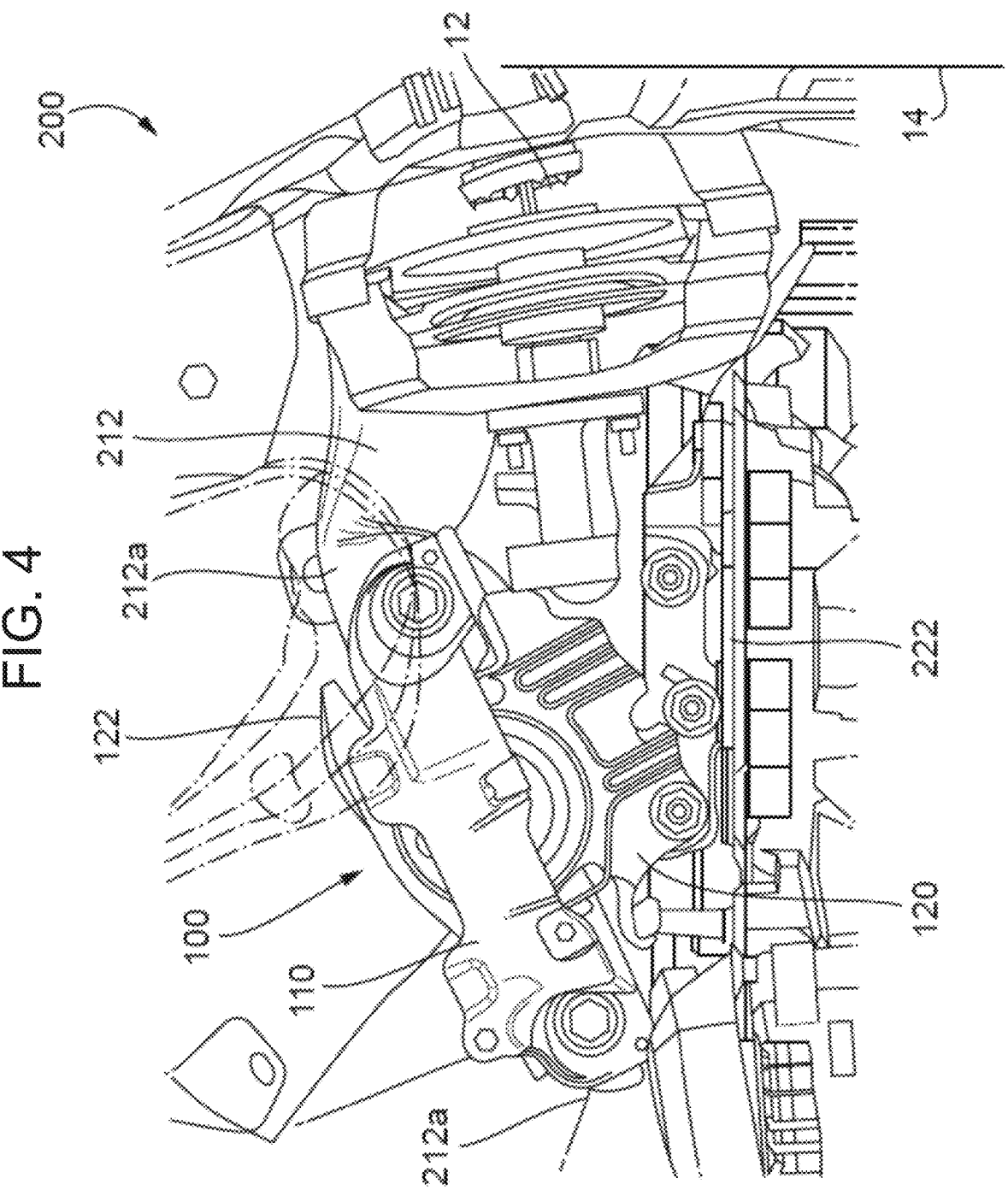
FIG. 4 shows a top view of the vehicle assembly, according to arrangements of the present disclosure, during a collision.

The following description relates to systems and methods for a powertrain support mount. The support mount comprises a first bracket configured to couple to a support frame of the motor vehicle and a second bracket configured to couple to a powertrain component of the motor vehicle. One of the first and second brackets comprises a catch feature configured to engage the other of the first and second brackets when the support frame is deflected during a collision of the vehicle, such that the first bracket applies a load to the second bracket to decouple the second bracket from the powertrain component. A vehicle without the catch feature is shown in FIG. 1A and the vehicle in a collision is shown in FIG. 1B. As shown, the exclusion of the catch feature may result in one of the first and second brackets colliding with an ancillary component in a way that may result in the ancillary component colliding and extending into an interior cabin of the vehicle. FIGS. 2 and 3 show a vehicle comprising the catch outside of a collision. FIG. 4 shows the vehicle with the catch during the collision. As shown, the catch may prevent one of the brackets from colliding with the ancillary component so that the ancillary component may not intrude into the interior cabin.

FIGS. 1A-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

With reference to FIG. 1A, it shows a previous example of a motor vehicle 2 comprising a powertrain 4 and a support structure assembly 6. The support structure assembly 6 comprises a support rail 8 and a mount 10. A component 4a of the powertrain 4 is coupled to the support rail 8 by the mount 10. The mount 10 comprises a first bracket 10a coupled to the support rail 8 and a second bracket 10b coupled to the powertrain component 4a. The first and second mount brackets 10a, 10b are configured such that, during normal operation of the motor vehicle 2, loads are transferred from the powertrain 4 to the support rail 8 via the engine mount 10.

The support rail 8 forms part of a crash structure of the motor vehicle 2 and, as depicted in FIG. 1B, is configured to deform and buckle during a collision of the motor vehicle in order to dissipate energy from the collision. When the support rail 8 buckles, the first bracket 10a of the mount 10 may be pulled away from the second bracket 10b of the mount 10.

In some arrangements of the previous example of the motor vehicle 2, an ancillary component, such as a brake master servo 12 may be provided adjacent, or close to, the powertrain component 4a. In one example, the brake master servo 12 is arranged in a region between the powertrain component 4a and the dash panel 14, wherein a distance between the powertrain component 4a and the brake master servo 12 is less than a threshold distance. In some examples, the threshold distance is based on a length of the powertrain component 4a. In one example, the threshold distance is less than 50% of the length of the powertrain component 4a. In another example, the threshold distance is less than 25% of the length of the powertrain component 4a. In other examples, the threshold distance is less than 10% of the length of the powertrain component. By decreasing the space between the powertrain component 4a and the brake master servo 12, packaging restraints may be reduced.

The brake master servo 12 and the powertrain component 4a may be configured such that the powertrain component 4a moves past the brake master servo 12 without colliding with the brake master servo 12 when the powertrain component 4a is displaced during a collision of the vehicle 2. However, as shown in FIG. 1B, if the second bracket 10b of the mount 10 remains coupled to the powertrain component 4a during the collision, the second bracket 10b may collide with the brake master servo 12, causing the brake master servo 12 to be deflected and deform the dash panel 14 of the vehicle, intruding into a cabin of the motor vehicle.

With reference to FIG. 2, a motor vehicle 200, according to arrangements of the present disclosure, comprises a support structure assembly 210 and a powertrain 220. The support structure assembly 210 comprises a support frame, such as a support rail 212 and a powertrain support mount 100.

Turning now to FIGS. 2 and 3, the powertrain support mount 100, according to arrangements of the present disclosure, is shown comprising a first bracket 110 and a second bracket 120. The first bracket 110 may be configured to couple to the support rail 212 and the second bracket 120 may be configured to couple to a component 222 of the motor vehicle powertrain 220, such as an engine or transmission of the motor vehicle. The first and second brackets 110, 120 may engage one another in order to transfer load from the powertrain component 222 to the support rail 212 during operation of the motor vehicle 200. As such, the engagement between the first and second brackets 110, 120 may be mechanical or another similar engagement able to transfer load.

The second bracket 120 may comprise a coupling portion 124. The second bracket 120 may be configured to be coupled to the powertrain component 222 at the coupling portion 124. In the arrangement shown, the coupling portion 124 may comprise one or more fastener openings 124a configured to receive fasteners for coupling the second bracket 120 to the powertrain component 222. The powertrain component 222 may comprise corresponding bores configure to receive the fasteners. The bores may be threaded and the fasteners may be threaded into the bores after passing through the fastener openings 124a. Alternatively, the fastener openings 124a may be threaded and the fasteners may pass through the bores of the powertrain component 222 before being threaded into the fastener openings 124a. In one example, the powertrain component 222 may be a steel bracket shaped to mate with the fastener openings 124 via a weld nut. Alternatively again, neither the fastener openings 124a nor the bores may be threaded, and separate threaded nuts may be provided. In the example of FIG. 3, there are exactly three of the fastener openings 124a, however, other numbers of openings less than or greater than three may be used without departing from the scope of the present disclosure.

The first bracket 110 may comprise a coupling portion 111, which may be configured in a similar way to the coupling portion 124 of the second bracket 120 described above. The first bracket 110 may be configured to be coupled to the support frame (e.g. to the support rail 212) at the coupling portion 111. The first bracket 110 and the support frame may be configured to be coupled together in all of the ways described above in relation to the second bracket 120 and the powertrain component 222 and the features of the second bracket 120 and the powertrain component 222 described above may apply equally to the first bracket 110 and the support frame (e.g. the support rail 212). It will be appreciated that, in a particular arrangement of the disclosure, the first bracket 110 may be coupled to the support frame in a different way to the way in which the second bracket 120 is coupled to the powertrain component 222.

During normal operation of the motor vehicle 200 (e.g. when the motor vehicle is not experiencing a collision) the first and second brackets 110, 120 may be configured to transfer load between the powertrain component 222 and the support rail 212 in a first direction 292. The first direction may be substantially lateral. In some arrangements, the first direction may have a component in a longitudinal direction of the motor vehicle 200. Additionally or alternatively, the first direction may have a component in each of the lateral and longitudinal directions of the motor vehicle.

In some arrangements of the disclosure, the first and second brackets 110, 120 may be configured to transfer load between the powertrain component 222 and the support rail 212 in a further direction. The further direction may be angled or substantially perpendicular to the first direction.

The second bracket 120 may comprise an engagement feature 122. The engagement feature 122 may comprise an arm 125 extending from the second bracket 120. The engagement feature 122 may extend in a substantially longitudinal direction of the motor vehicle 200. In some arrangements, the arm 125 may extend in a direction substantially parallel with a support rail (e.g., such as the support rail 8 of FIG. 1A). The engagement feature 122 may extend from the second bracket 120 in a rearward direction 294 of the motor vehicle 200 toward the dash panel 14. The rearward direction 294 may be substantially perpendicular to the first direction 292 in one example. The engagement feature 122 may comprise one or more stiffening features, such as ribs, webs and/or areas of increased thickness.

The engagement feature 122 is configured to engage the first bracket 110 during a collision of the motor vehicle, such that load can be transferred from the first bracket 110 to the second bracket 120 in a second direction. The second direction may be substantially perpendicular to the first direction. When the first and second brackets 110, 120 are configured to transfer load between the powertrain component 222 and the support rail 212 in the further direction, the second direction may be perpendicular to the first direction and the further direction. In one example, the first direction is a vertical direction, the further direction is a longitudinal direction relative to the vehicle, and the second direction is a lateral direction parallel to inboard and outboard directions. In the arrangement shown, the second direction is in a substantially lateral direction of the motor vehicle. In other arrangements, the second direction may be a substantially longitudinal direction of the motor vehicle or a vertical direction or may have components, the longitudinal, lateral and/or vertical directions.

The first bracket 110 may comprise an abutment feature 118. The abutment feature 118 may be configured such that the engagement feature 122 engages the first bracket 110 at the abutment feature 118 during a collision of the motor vehicle 2, in order to transfer load between the first and second brackets 110, 120 (e.g. in the second direction). The abutment feature 118 may comprise one or more stiffening features, such as webs, ribs and/or areas of increased thickness (e.g. compared to portions of the first bracket 110 adjacent to the abutment feature 118). The stiffening features may extend between the abutment feature 118 and the coupling portion 111 of the first bracket 110. The abutment feature 118 and associated stiffening features may thereby be configured to reduce deflections of the first bracket 110 when load is transferred from the support rail 212 to the second bracket 120 in the second direction. The engagement feature 122 may be spaced apart from the first bracket 110 (e.g. the abutment feature 118) during the normal operation of the motor vehicle.

Turning now to FIG. 4, it shows the motor vehicle 200 experiencing a collision, the support rail 212 may bend and/or buckle. The support rail 212 may be configured to buckle under the loads experienced by the vehicle during the collision, such that the powertrain support mount 100 is displaced away from the dash panel 14 and nearby ancillary components, such as the brake master servo 12 (e.g. relative to the powertrain component 222).

The support rail 212 may comprise a plurality of buckling initiation features 212a provided along the support rail. The buckling initiation features 212a may be configured to control the buckling of the support rail 212 during the collision. As shown, the support rail 212 may comprise a buckling initiation feature 212a on each side of the powertrain support mount 100 along the support rail 212 (e.g. in a longitudinal direction of the motor vehicle) in order to achieve the desired displacement of the powertrain support mount 100 during the collision.

The support rail 212 may apply a load to the first bracket 110 in the second direction, or a direction with a component in the second direction, as the support rail 212 buckles. Applying the load in the second direction displaces the first bracket 110 and causes the engagement feature 122 of the second bracket 120 to engage the abutment feature 118 of the first bracket 110. Load can thereby be transferred from the support rail 212, through the first bracket 110, and to the second bracket 120 in the second direction (e.g. via the engagement feature 122). Additionally, loads may be transferred from the first bracket 110 to the second bracket 120 in the first and/or further directions during the collision in the same manner as before the collision during normal operation.

The powertrain support mount 100 is configured to decouple from the powertrain component 222 under the load applied to the second bracket 120 during a collision (e.g. in the second direction). In particular, as depicted in FIG. 4, the second bracket 120 may be configured to degrade (e.g. fracture) under load applied to the second bracket 120. That is to say, the second bracket 120 is shaped to desirably degrade in a desired location in the event of a collision applying a sufficient load so that the second bracket 120 moves in a desired direction.

In the arrangement depicted in FIG. 3, the second bracket 120 is configured to degrade at the coupling portion 124. The coupling portion 124 may comprise one or more weakening features 124b, such as notches and/or areas of reduced thickness, adjacent to the fastener apertures 124a. The weakening features 124b may encourage the coupling portion 124 to degrade at the connection with the powertrain component 222.

In other arrangements, the second bracket 120 may be configured to degrade at a position away from the coupling portion 124 (e.g. between the coupling portion 124 and the engagement feature 122). When the second bracket fails, the powertrain support mount 100 becomes decoupled from the powertrain component 222.

Returning to FIG. 3, the first bracket 110 may define an aperture 116 through which the second bracket 118 extends. The first bracket 110 may comprise a first part 112 and a second part 114. The aperture 116 may be defined by the first bracket 110 between the first and second parts 112, 114. The first and second brackets 110, 120 may be configured to engage with one another at (e.g. inside) the aperture in order to transfer load between the first and second brackets 110, 120 (e.g. in the first direction and optionally in the further direction). A resilient element may be provided between the first and second brackets and may be comprised of rubber or other elastomeric material (e.g. to dampen vibrations from the powertrain).

In the arrangement shown, the second bracket 120 passes through the aperture, such that portions of the second bracket 120 are arranged on each side of the aperture 116. In particular, the coupling portion 124 may be provided on a first side of the aperture 116 (e.g. adjacent to the powertrain 220) and the engagement feature 122 may be provided on a second side of the aperture 116 (e.g. adjacent to the support frame). The second bracket 120 may extend through the aperture 116 in a direction substantially parallel to the second direction. The engagement feature 122 may extend from the second bracket 120 in a direction substantially perpendicular to the portion of the second bracket 120 extending though the aperture. In other words, the engagement feature 122 may extend in a direction substantially parallel to a plane of the aperture 116.

In some arrangements, the engagement feature 122 may be configured to engage the first bracket at a position adjacent to the aperture 116 (e.g. at an edge of the aperture 116). The abutment feature 118 may be formed adjacent to, e.g. at an edge of, the aperture 116.

A width and/or height of the engagement feature 122, or the second bracket 120 at the position of the engagement feature 122, may be greater than a respective width and/or height of the aperture 116. In some arrangements, a cross-sectional area of the engagement feature 122, or the second bracket 120 at the engagement feature 122, may be greater than a cross-sectional area of the aperture 116 in a plane perpendicular to the second direction, e.g. the direction in which the second bracket 120 extends through the aperture 116. The engagement feature 122 may thereby be prevented from passing through the aperture 116 once the first bracket 110 has been assembled.

Once the second bracket 120 becomes decoupled from the powertrain component 222, the second bracket 120 may be retained by the first bracket 110, e.g. within the aperture 116, due to the relative sizes of the engagement feature 122 and the aperture 116. In other words, the second bracket 120 may be coupled to the support frame (e.g. the support rail 212 by the first bracket 110). The second bracket 120 may be displaced together with the first bracket 110 during the remainder of the collision. As shown in FIG. 4, due to the mode of buckling of the support frame, the second bracket 120 may be displaced away from the dash panel 14 of the vehicle and ancillary components, such as the brake master servo 12 (e.g. relative to the powertrain component 222). Deformation of the dash panel 14 and intrusion into the cabin of the vehicle 200 may thereby be reduced compared to the vehicle 2 in a similar collision shown in FIG. 1A.

In the arrangements described herein, the engagement feature 122 is provided on the second bracket 120. However, it is equally envisaged that in other arrangements of the present disclosure, an engagement feature may additionally or alternatively be provided on the first bracket 110 and may be configured to engage an abutment feature formed on the second bracket 120 during the collision.

In one embodiment, a vehicle comprises a catcher hook and/or an arm arranged along an active side bracket to use a rail deformation pattern to induce a Y-load into a mount to which the active side bracket is coupled. The rail deformation pattern may deform at a crushable can, a first bend point between a shotgun attachment and a mount, and a second bend point between the mount and a stiff section. The passive side bracket, different than the active side bracket, may be strengthened. In one example, the passive side bracket comprises cast iron or other similar durable material to withstand the Y-load. The passive side bracket may transfer the Y-load between a siderail and the catcher hook and/or the arm.

In some examples, additionally or alternatively, the active side bracket may be manufactured as more than one piece, wherein the first piece may be a primary body of the active side bracket and the second piece may be the catcher hook and/or arm. By manufacturing the active side bracket as two or more pieces, the second piece (e.g., the catcher hook and/or arm) may be larger than an aperture of the passive side bracket through which the active side bracket extends. In one example, the active side bracket may be similar to the second bracket 120 of FIG. 4 and the passive side bracket may be similar to the first bracket 110 of FIG. 4.

Additionally or alternatively, the passive side bracket may be manufactured as more than one piece. More specifically, the passive side bracket may be manufactured as two pieces, wherein the two pieces may join and shape the aperture through which the active side bracket extends. The size of the aperture may be less than the size of the catcher hook and/or arm so that the arm may not pass through the aperture during a collision.

In this way, forces during a vehicle collision may be diverted to prevent a component of the powertrain or an ancillary component adjacent to the powertrain from penetrating a vehicle cabin. Bosses of an active side bracket may be weakened at an engine side, the active side bracket may further comprise a catch and/or an arm at a side opposite the engine side, where the catch and/or the arm may interact with a passive side bracket. The technical effect of weakening the active side bracket via bosses, thinner material, or the like is to promote its degradation during a collision and to block the active side bracket from swinging and contacting ancillary components adjacent to the powertrain.

An embodiment for a support mount assembly for a powertrain of a motor vehicle, the support mount assembly comprises a first bracket configured to couple to a support frame of the motor vehicle and a second bracket, the second bracket comprising a coupling, wherein the second bracket is configured to couple to a powertrain component of the motor vehicle at the coupling, wherein one of the first and second brackets comprises an engagement feature configured to engage the other of the first and second brackets when the support frame is deflected during a collision of the vehicle, such that the first bracket is pulled away from the second bracket, the engagement feature engaging the other of the first and second brackets such that the first bracket applies a load to the second bracket to decouple the second bracket from the powertrain component. A first example of the support mount assembly further includes where the other of the first and second brackets comprises an abutment feature configured to engage with the engagement feature during the collision, wherein the abutment feature comprises one or more stiffening features. A second example of the support mount assembly, optionally including the first example, further includes where the second bracket comprises the engagement feature and the first bracket comprises the abutment feature. A third example of the support mount assembly, optionally including the first and/or second examples, further includes where the first bracket defines an aperture, wherein a portion of the second bracket passes though the aperture formed in the first bracket. A fourth example of the support mount assembly, optionally including one or more of the first through third examples, further includes where an abutment feature is formed adjacent to the aperture, and where the abutment feature is configured to engage with the engagement feature. A fifth example of the support mount assembly, optionally including one or more of the first through fourth examples, further includes where the coupling of the second bracket configured to couple to the powertrain component is arranged on a first side of the aperture, and the engagement feature is arranged on a second side of the aperture. A sixth example of the support mount assembly, optionally including one or more of the first through fifth examples, further includes where the first bracket comprises two parts, the aperture being formed between the two parts. A seventh example of the support mount assembly, optionally including one or more of the first through sixth examples, further includes where a width and/or height of the engagement feature is greater than a respective width and/or height of the aperture, such that the engagement feature is prevented from passing through the aperture. An eighth example of the support mount assembly, optionally including one or more of the first through seventh examples, further includes where the first and second brackets are configured to engage one another at a location away from the engagement feature, and where a load is transferred between the powertrain component and the support frame in a first direction. A ninth example of the support mount assembly, optionally including one or more of the first through eighth examples, further includes where the first and second brackets are configured to additionally transfer the load between the power train component and the support frame in a second direction, perpendicular to the first direction, when the engagement feature is engaged. A tenth example of the support mount assembly, optionally including one or more of the first through ninth examples, further includes where the first bracket is configured to retain the second bracket after the second bracket is decoupled from the powertrain component. An eleventh example of the support mount assembly, optionally including one or more of the first through tenth examples, further includes where the coupling comprises one or more weakening features configured to encourage the second bracket to fail at the coupling during the collision. A twelfth example of the support mount assembly, optionally including one or more of the first through eleventh examples, further includes where the weakening features include one or more of notches and areas of reduced thickness. A thirteenth example of the support mount assembly, optionally including one or more of the first through twelfth examples, further includes where a support rail coupled to the first bracket, and where the support rail is configured to buckle during a collision, and where the support rail displaces the first bracket as it buckles to engage the engagement feature, and where the support mount assembly is displaced away from a dash panel or an auxiliary component of the motor vehicle relative to the powertrain component.

An embodiment of an engine support bracket for a vehicle comprises a passive side component configured to couple to a support frame of the vehicle and an active side component configured to couple to a powertrain of the vehicle, wherein the active side component comprises a catch feature configured to engage the passive side component when the support frame is deflected during a collision. A first example of the engine support bracket further comprises where the passive side component applies a load to the active side component to decouple the active side component from the powertrain during the collision. A second example of the engine support bracket, optionally including the first example, further includes where the passive side component comprises two pieces, the two pieces coupling to form an aperture through which the active side component passage, and where the catch feature is larger than the aperture. A third example of the engine support bracket, optionally including the first and/or second examples, further includes where the active side component comprises a plurality of fastening bosses arranged opposite the catch feature, and where the active side component comprises a plurality of weakening notches arranged near the plurality of fastening bosses.

A system comprising an active side component comprising a plurality of fastening bosses for coupling to an engine and a catch feature arranged at an opposite portion of the active side component relative to the plurality of fastening bosses and a passive side component configured to couple to a support frame, the passive side component comprising two pieces joining to form an aperture therebetween through which the active side component extends, and where the aperture is sized to be smaller than the catch feature. A first example of the system further includes where the passive side component moves in an outboards direction in response to a collision until the catch feature hooks onto the passive side component, following which the active side component moves in an outboards direction to degrade the plurality of fastening bosses, and where the active side component comprises a plurality of notches adjacent to the plurality of fastening bosses.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A support mount assembly for a powertrain of a motor vehicle, the support mount assembly comprising:
    a first bracket configured to couple to a support frame of the motor vehicle; and
    a second bracket, the second bracket comprising a coupling, wherein the second bracket is configured to couple to a powertrain component of the motor vehicle at the coupling, wherein one of the first and second brackets comprises an engagement feature configured to engage with an abutment feature of the other of the first and second brackets when the support frame is deflected during a collision of the motor vehicle, such that the first bracket is pulled away from the second bracket, the engagement feature engaging the abutment feature such that the first bracket applies a load to the second bracket to decouple the second bracket from the powertrain component, and wherein the abutment feature includes one or more areas of increased thickness perpendicular to the coupling.

2. The support mount assembly of claim 1, wherein the second bracket comprises the engagement feature and the first bracket comprises the abutment feature.

3. The support mount assembly of claim 1, wherein the first bracket defines an aperture, wherein a portion of the second bracket passes though the aperture formed in the first bracket.

4. The support mount assembly of claim 3, wherein the abutment feature is formed adjacent to the aperture.

5. The support mount assembly of claim 3, wherein the coupling of the second bracket configured to couple to the powertrain component is arranged on a first side of the aperture, and the engagement feature is arranged on a second side of the aperture.

6. The support mount assembly of claim 3, wherein the first bracket comprises two parts, the aperture being formed between the two parts.

7. The support mount assembly of claim 6, wherein a width and/or height of the engagement feature is greater than a respective width and/or height of the aperture, such that the engagement feature is prevented from passing through the aperture.

8. The support mount assembly of claim 1, wherein the first and second brackets are configured to engage one another at a location away from the engagement feature, and where a load is transferred between the powertrain component and the support frame in a first direction.

9. The support mount assembly of claim 8, wherein the first and second brackets are configured to additionally transfer the load between the power train component and the support frame in a second direction, perpendicular to the first direction, when the engagement feature is engaged.

10. The support mount assembly of claim 1, wherein the first bracket is configured to retain the second bracket after the second bracket is decoupled from the powertrain component.

11. The support mount assembly of claim 1, wherein the coupling comprises one or more weakening features configured to encourage the second bracket to fail at the coupling during the collision.

12. The support mount assembly of claim 11, wherein the weakening features include one or more of notches and areas of reduced thickness.

13. The support mount assembly of claim 1, further comprising a support rail coupled to the first bracket, and where the support rail is configured to buckle during a collision, and where the support rail displaces the first bracket as it buckles to engage the engagement feature, and where the support mount assembly is displaced away from a dash panel or an auxiliary component of the motor vehicle relative to the powertrain component.

14. An engine support bracket for a vehicle, comprising:
a passive side component configured to couple to a support frame of the vehicle; and
an active side component configured to couple to a powertrain of the vehicle, wherein the active side component comprises a catch feature configured to engage with an abutment feature of the passive side component when the support frame is deflected during a collision, where the abutment feature includes one or more areas of increased thickness relative to an adjacent portion of the passive side component.

15. The engine support bracket of claim 14, wherein the passive side component applies a load to the active side component to decouple the active side component from the powertrain during the collision.

16. The engine support bracket of claim 14, wherein the passive side component comprises two pieces, the two pieces coupling to form an aperture through which the active side component passes, and where the catch feature is larger than the aperture.

17. The engine support bracket of claim 14, wherein the active side component comprises a plurality of fastening bosses arranged opposite the catch feature, and where the active side component comprises a plurality of weakening notches arranged near the plurality of fastening bosses.

18. A system, comprising:
an active side component comprising a plurality of fastening bosses for coupling to an engine and a catch feature arranged at an opposite portion of the active side component relative to the plurality of fastening bosses, the catch feature including an arm extending in a direction parallel with a support frame; and
a passive side component configured to couple to the support frame, the passive side component comprising two pieces joining to form an aperture therebetween through which the active side component extends, and where the aperture is sized to be smaller than the arm of the catch feature.

19. The system of claim 18, wherein the passive side component moves in an outboards direction in response to a collision until the catch feature hooks onto the passive side component, following which the active side component moves in an outboards direction to degrade the plurality of fastening bosses, and where the active side component comprises a plurality of notches adjacent to the plurality of fastening bosses.

* * * * *